United States Patent
Hendershot et al.

(12) 
(10) Patent No.: US 10,615,834 B1
(45) Date of Patent: Apr. 7, 2020

(54) TWO-WAY COMMUNICATION DEVICE WITH DETACHABLE TRANSMITTER AND METHOD OF OPERATION

(71) Applicant: Radio Design Group, Inc., Grants Pass, OR (US)

(72) Inventors: James Richard Hendershot, Grants Pass, OR (US); Alan Robert Young, Medford, OR (US)

(73) Assignee: Radio Design Group, Inc., Rogue River, OR (US)

( * ) Notice: Subject to any disclaimer, the term of this patent is extended or adjusted under 35 U.S.C. 154(b) by 0 days.

(21) Appl. No.: 16/042,946

(22) Filed: Jul. 23, 2018

Related U.S. Application Data

(60) Provisional application No. 62/538,607, filed on Jul. 28, 2017.

(51) Int. Cl.
*H04B 1/3827* (2015.01)
*H04B 1/034* (2006.01)
*H04B 1/08* (2006.01)

(52) U.S. Cl.
CPC .......... *H04B 1/3827* (2013.01); *H04B 1/034* (2013.01); *H04B 1/088* (2013.01)

(58) Field of Classification Search
None
See application file for complete search history.

(56) References Cited

U.S. PATENT DOCUMENTS

| | | | | |
|---|---|---|---|---|
| 5,923,624 | A * | 7/1999 | Groeger | G11B 31/00 369/7 |
| 6,014,705 | A | 1/2000 | Koenck et al. | |
| 6,549,144 | B1 | 4/2003 | Goeken | |
| 6,685,479 | B1 * | 2/2004 | Ghaly | G09B 19/00 434/236 |
| 6,865,401 | B2 * | 3/2005 | Kotzin | H04B 1/3816 455/426.1 |
| 7,095,981 | B1 * | 8/2006 | Voroba | H04B 1/385 455/41.2 |
| 7,233,787 | B2 * | 6/2007 | Higuchi | H04H 60/91 455/413 |
| 7,251,318 | B1 * | 7/2007 | Henderson | H04M 1/2745 340/7.56 |
| 7,313,430 | B2 | 12/2007 | Urquhart et al. | |
| 7,325,250 | B1 | 1/2008 | Barclay et al. | |

(Continued)

*Primary Examiner* — Lana N Le
(74) *Attorney, Agent, or Firm* — Jerry Haynes Law

(57) ABSTRACT

A two-way communication device with detachable transmitter and method of operation receives and/or sends communication signals. The device includes a receiver portion for receiving communication signals, and a transmitter portion for transmitting communication signals. The receiver and the transmitter may or may not be independently operational when detached. This detachability allows the receiver portion to be carried into secure areas where transmitters are not allowed without losing ability to be contacted. To indicate detachment, the receiver detects that the transmitter is detached via a signal pin. An indicator portion visually indicates whether the transmitter is detached or attached to the receiver. A control unit regulates communication signals with the receiver and transmitter. A user interface unit enables inputting and receiving data for communications. A housing protects the receiver and transmitter.

12 Claims, 6 Drawing Sheets

(56) References Cited

U.S. PATENT DOCUMENTS

| | | | |
|---|---|---|---|
| 7,630,646 B2 | 12/2009 | Anderson et al. | |
| 7,856,203 B2 | 12/2010 | Lipovski | |
| 9,031,582 B2 | 3/2015 | Mohr | |
| 9,172,788 B2 | 10/2015 | Mohr | |
| 9,330,560 B2 | 5/2016 | Lawson | |
| 9,888,442 B2 * | 2/2018 | Tsukamoto | H04W 12/06 |
| 2003/0199288 A1 * | 10/2003 | Bodnar | H04M 1/0254 |
| | | | 455/557 |
| 2004/0043799 A1 * | 3/2004 | Ishibashi | H04M 1/0214 |
| | | | 455/575.1 |
| 2004/0255011 A1 * | 12/2004 | Doi | G06Q 30/0621 |
| | | | 709/220 |
| 2007/0155424 A1 * | 7/2007 | Gasper | H04M 1/0202 |
| | | | 455/556.1 |
| 2008/0090565 A1 * | 4/2008 | Kim | H04B 1/202 |
| | | | 455/425 |
| 2011/0320130 A1 * | 12/2011 | Valdes | G06F 19/3418 |
| | | | 702/19 |
| 2014/0333254 A1 * | 11/2014 | Teng | H02J 50/12 |
| | | | 320/108 |
| 2015/0288404 A1 * | 10/2015 | Wang | H04M 1/6066 |
| | | | 455/569.1 |

\* cited by examiner

TWO-WAY COMMUNICATION DEVICE WITH DETACHABLE TRANSMITTER AND METHOD OF OPERATION

FIELD OF THE INVENTION

The present invention relates generally to a two-way communication device with detachable transmitter and method of operation. More specifically, the present invention relates to a mobile two-way communication device with a detachable transmitter for entry of the two-way communication device, without the transmitter attached, into a secure non-transmission zone. Thus, embodiments relate to a number of improvements in two-way communications technology as applicable to secure non-transmission zones.

BACKGROUND

In today's technologically-oriented society, two-way communication devices have become ubiquitous. There are cellular telephones, smartphones, smartwatches, personal digital assistants, tablet computers, laptops, and two-way radios among others. These two-way communication devices are generally capable of both receiving and transmitting communications, and therefore may function as two-way communication devices. Often the receiving and transmitting functions are performed by transceivers that are either attached to or built into the two-way communication devices. Often, two-way communication devices are mobile and/or capable of wireless communication.

While the wide availability of mobile two-way communication devices has many advantages, in certain sensitive high-security environments two-way communication devices are a security risk. These sensitive high-security environments may be designated as non-transmission zones where both transmission and transmitters are prohibited.

For example, in the military, military personnel may be required to carry mobile two-way communication devices. But certain military locations are non-transmission zones. Generally, in these non-transmission zones it is not enough to simply prohibit military personnel from using their two-way communication devices for transmitting. Instead, military personnel are prohibited from bringing into the non-transmission zone a device that is capable of transmitting. Moreover, security personnel securing these non-transmission zones must be able to determine quickly whether a device is capable of transmitting or not. Therefore, in many military non-transmission zones military personnel may only bring pagers into the non-transmission zone.

Restricting military personnel to pagers in non-transmission zones does serve to reduce the risk of unauthorized transmissions, but this approach unnecessarily restricts these military personnel to just receiving paging messages while they are in a non-transmission zone. An approach is needed in which these military personnel could receive communications while at the same time being unable to transmit from the non-transmission zone. Previously existing devices however are inadequate for a variety of reasons.

For example, some devices are capable of being placed into an airplane mode in which they are not operable to receive or transmit. But for most devices, a user can put a device into and out of airplane mode. Therefore, these devices would still present a risk of being used for transmissions inside a non-transmission zone. In some cases, a third-party device can be used to place a two-way communication device in an airplane mode. See, e.g. U.S. Pat. No. 9,031,582 ("Mohr"). If this is implemented merely in software, then there may also be a perception that software security solutions are more easily defeated as compared to hardware solutions. Moreover, this solution may also require a third-party device. If so, then issues may arise of compatibility between the third-party device and the two-way communication device. Therefore, logistical and security issues are still presented.

Another type of device allows a transceiver module of a device to be removable for replacement with another transceiver module, perhaps selected from a plurality of transceiver modules. See, e.g. U.S. Pat. No. 6,014,705 ("Koenck"), U.S. Patent Application Publication No. 2007/0155424 ("Gasper"). The purpose of this type of arrangement is usually for compatible operability of the device in different environments (where it might receive different types of signals), rather than security. Also, if this type of device were operated with the transceiver module removed, receiving and well as transmission would be disabled.

Thus, there is a need for a two-way communication device with a mechanism for disabling transmission while the two-way communication device is a non-transmission zone. One design consideration is whether the disabling of transmission also disables reception. Another design consideration is whether the disabling of transmission is at least partly done with hardware as contrasted with software.

SUMMARY

This summary is provided as a convenience to the reader as a summary of one or more embodiments. The discussion in this Summary is intentionally simplified. It is not intended as guide for construing or limiting the scope of the claims.

Certain embodiments of the present invention relate to a two-way communication device for receiving and/or sending communication signals that includes, a receiver portion that can be placed on or to the ear of the user to allow information received via the communication signals to be listened to via a speaker in the part; and a transmitter portion for transmitting communication signals that is detachable from the receiver portion; whereby detaching the transmitter portion from the device enables the device to receive communications but not respond; whereby this detachability allows the receiver portion to be carried into secure areas where transmitters are not allowed without losing the ability to be contacted; and whereby an indicator portion is operational on the receiver portion, and indicates whether the transmitter portion is detached or attached.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
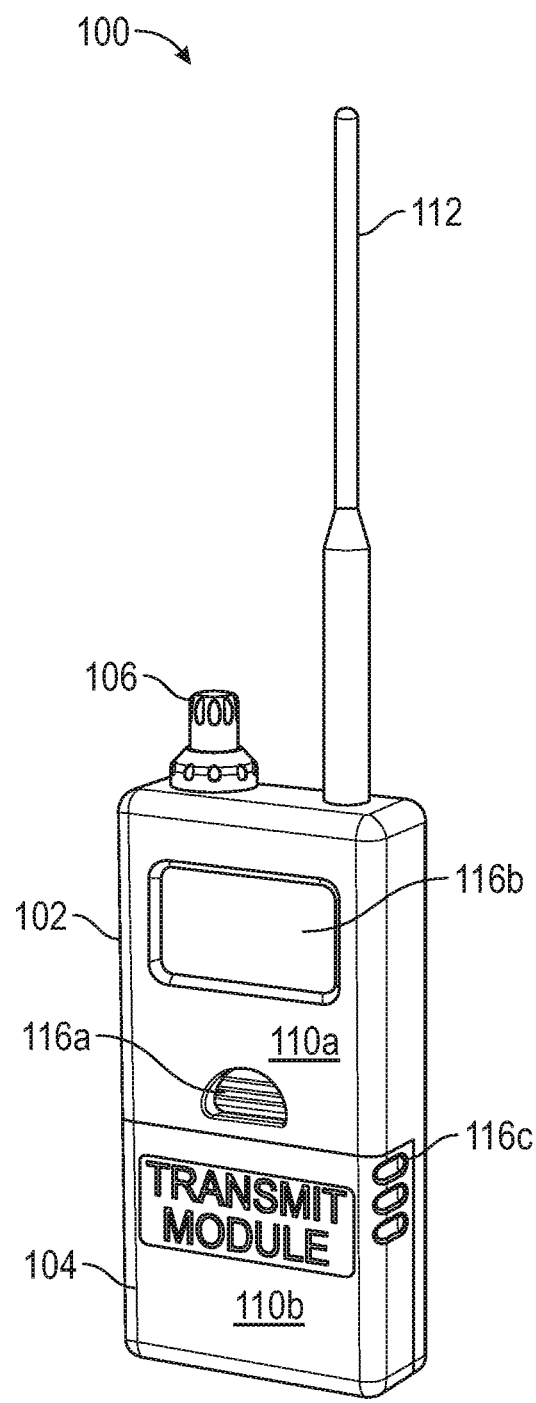
FIG. 1 illustrates a perspective view of an exemplary two-way communication device with detachable transmitter, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Additionally, multiple references in the below description to "one embodiment" or to "some embodiments" may not be describing the same embodiments. Further, the inclusion and discussion or illustration of various features, components, and/or circuitries in various devices should not be construed as a statement that such features, components and/or circuitries are essential so as to be required in all device embodiments. Similarly, the inclusion of a step in a method should not be construed as a statement that such a step is essential so as to be required in all method embodiments.

A two-way communication device 100 with detachable transmitter and method 200 of operation is referenced in FIGS. 1-4. The two-way communication device 100, hereafter "device 100" may include all manner of devices known in the art including, without limitation, a transceiver, a radio (e.g., a two-way radio), a walkie-talkie, a cellular telephone, a smartphone, a pager, a smartwatch, a personal digital assistant, a tablet computer, a laptop computer, a wireless modem, or other known communication apparatus or device that is configured to receive and/or send communication signals between multiple users.

The device 100 includes a receiver portion 102 for receiving communication signals. The receiver portion 102 is operational to be placed on or to the ear of a user to allow information received via the communication signals to be listened to via a speaker in the receiver portion 102. In some embodiments the receiver portion 102 is configured with an interface for one or more of a headset or earbuds. The device 100 also includes a transmitter portion 104 for transmitting communication signals. The transmitter portion 104 is configured to easily detach from the receiver portion 102. As discussed below, either the receiver portion 104, the transmitter portion 104, or both may be configured with a microphone. In some embodiments the transmitter portion 104 is configured with a Bluetooth connection for peripheral devices, such as a microphone.

The transmitter portion 104 is physically detachable from the receiver portion 102, such that the receiver portion 102 and the transmitter portion 104 are independently operational when detached. This detachability allows the receiver portion 102 to be carried into secure areas where transmitters are not allowed without losing the ability to be contacted. When detached from the transmitter portion 104, the receiver portion 102 can, however, receive communication signals, but cannot transmit a communication signal. This communicative restriction provides additional security, so as to inhibit transmission of communication signals from the secured area.

The transmitter portion 104 periodically transmits a signal to the receiver portion 102 indicating detachment there between. This signal can serve as a reminder to a user that the transmitter and receiver are not attached.

In some embodiments the reminder signal may be used to authenticate that a detached receiver portion 102 belongs with a given detached transmitter portion 104. For example, transmitter portion 104 may be configured with a user input interface feature, such as a button (now shown), that may be configured for causing the transmitter portion 104 to immediately send a reminder signal to receiver portion 102. When the receiver portion 102 receives the reminder signal and responds (e.g., by lighting up indicator 106, by emitting a sound, or by other visual and/or auditory signal), then the receiver portion 102 is authenticated as belonging with the transmitter portion 104.

The receiver portion 102 detects that the transmitter portion 104 is detached via a signal pin 118 on the detachable connector. The receiver portion then enters a Receive Only mode. Receive Only mode allows the receiver portion 102 to remind the user that the transmitter portion 104 and the receiver portion 102 are no longer connected. An indicator portion 106 is operational on the receiver portion 102 to visually indicate, for example, through illuminating colors, whether the transmitter portion 104 is detached or attached to the receiver portion 102.

A control unit 108 is integrated with the receiver portion 102 to regulate communication signals to and from the receiver and transmitter portion 102, 104. A user interface unit 116a-c is integrated with the receiver portion 102 to enable inputting and receiving data for communications. At least one housing 110a, 110b protects the receiver and transmitter portion 104. The housing 110a, 110b is durable and inhibits moisture, dust, and damage from physical contact.

One aspect of a two-way communication device 100 with detachable transmitter, comprises:
  a receiver portion 102 for receiving communication signals;
  a transmitter portion 104 for transmitting communication signals, the transmitter portion 104 being detachably attached to the receiver portion 102, whereby the receiver portion 102 and the transmitter portion 104 may or may not operate independently when detached;

an indicator portion 106 operationally coupled to the receiver portion 102, the indicator portion 106 for indicating whether the transmitter portion 104 is detached or attached to the receiver portion 102;

a user interface unit 116*a-c* operationally coupled to the receiver portion 102, the user interface unit 116*a-c* for inputting and receiving data for communications;

a control unit 108 operationally coupled to the user interface unit 116*a-c*, the control unit 108 regulating communication signals to and from the receiver portion 102 and the transmitter portion 104;

at least one housing 110*a*, 110*b* encapsulating the receiver portion 102 and the transmitter portion 104, the housing 110*a*, 110*b* helping to inhibit moisture, dust, and physical contact to the receiver portion 102 and the transmitter portion 104; and a power supply 114 for powering the receiver portion 102, or the transmitter portion 104, or both.

In another aspect, the receiver portion 102 comprises a speaker and electrical switches.

In another aspect, the transmitter portion 104 comprises a microphone and electrical switches.

In another aspect, the user interface unit 116*a-c* includes at least one of the following: a keyboard, a microphone, a speaker, a rotary encoder, a trackpad, and a mouse.

In another aspect, the indicator portion 106 is a light. The light could illuminate as a color, the color being a color selected from any one of many different colors known to those skilled in the art.

In another aspect, the light illuminates a green color to indicate the transmitter portion 104 is attached to the receiver portion 102.

In another aspect, the light illuminates a red color to indicate the transmitter portion 104 is detached from the receiver portion 102. The light could also be replaced by a mechanical indication, such as a green color that is exposed when the transmitter is separated, or perhaps a mechanical flag assembly. As a further example, one or more colors could be exposed on at least a portion of areas 110A and 116A to serve as an indicator.

In another aspect, the at least one housing 110*a-b* is rectangular.

In another aspect, the power supply 114 is a battery.

In another aspect, the two-way communication device 100 is a radio.

One objective of the present invention is to provide a two-way communication device 100 that excludes the receiver portion 102 from a secured area.

Another objective is to enable efficient receiving and transmitting communications with a user interface unit 116*a-c*.

Yet another objective is to replace the use of pagers for communication in secure areas.

Yet another objective is to store digital responses in the receive portion, and then automatically send the digital response once the transmitter portion 104 is re-attached.

Yet another objective is to separate the receiver portion 102 from the transmitter portion 104 without damage to either, even when power is switched on.

Yet another objective is to provide a visual indication that it is safe or not safe to take the device 100 into secure areas.

Yet another objective is to configure the transmitter portion 104 to periodically transmit a signal to the receiver portion 102 over a short range, such that if the user forgets the transmitter portion 104, the receiver portion 102 notifies the omission.

Yet another objective is to provide an inexpensive to manufacture two-way communication device 100.

Those skilled in the art will recognize that a two-way communication device 100 often comprises loudspeakers, microphones and switches housed within a robust outer casing having apertures in the front face to allow sound waves to enter and leave the device 100 and to locate the switches.

The device 100 allows the receiver portion 102 to be operational, without requiring the transmitter portion 104 to be attached thereto. In this manner, if the user is called or paged while in a secure area, they can leave the area, install the transmit unit (which is left outside the secure area) and respond to the call or page. Thus, the user does not need to carry a separate two-way communications device.

In addition to being convenient, this advantage is critical in specialized strategic or tactical communications systems, which are typically EMP hardened, encrypted, or both. Also, the close coordination between receiver portion 102 and removable transmitter portion 104 may be required for proper system operation, which could not be supplied by completely separate devices.

For example, without limitation, military personnel (and civilians in similar situations) are required to carry a communications device in order to be contacted quickly, no matter where they are. Frequently they work in secure environments where anything with a transmitter is prohibited, such as two-way radios and cellphones. Currently, people in these situations carry pagers (which can only receive, but not transmit) and they must find a phone outside of the secure area to call in when they are paged. This can result in substantial delays in responding to urgent messages. The device 100 helps solve these issues by enabling the transmitter to be detached, while also allowing the receiver to be operational during this detachment.

As illustrated in FIG. 1, the two-way communication device 100 is configured to both transmit and receive a communication signal. In this manner, the device 100 allows the user to have a conversation with other similar two-way communication devices, i.e. radios, operating on the same radio frequency (channel). The device 100 may include, without limitation, a transceiver, and a two-way radio in mobile, stationary base, and hand-held portable configurations. Though any communication device or system may be used. The device 100 is operable in a half-duplex mode, or a full-duplex mode.

In one embodiment, the device 100 comprises a receiver portion 102 for receiving communication signals, and specifically radio waves for audio signals. The receiver portion 102 comprises a speaker and electrical switches. The receiver portion 102 is operational with a transmitter portion 104, described below. The receiver portion 102 is operable independently of the transmitter portion 104, such that the receiver portion 102 can detach from the transmitter portion 104 and still remain operational to receive communication signals.

The device 100 further comprises a transmitter portion 104 for transmitting communication signals. The transmitter portion 104 is detachably attached to the receiver portion 102, such that the receiver portion 102 and the transmitter portion 104 are independently operational when detached. It is significant that the receiver portion 102 cannot, however, transmit a communication signal that could be received when the transmitter portion 104 is detached therefrom. In one embodiment, the transmitter portion 104 comprises a microphone and electrical switches. The transmitter portion 104 may also include a push-to-talk button on a cord or wireless electronics box clipped to the user's clothing.

Figure 2:
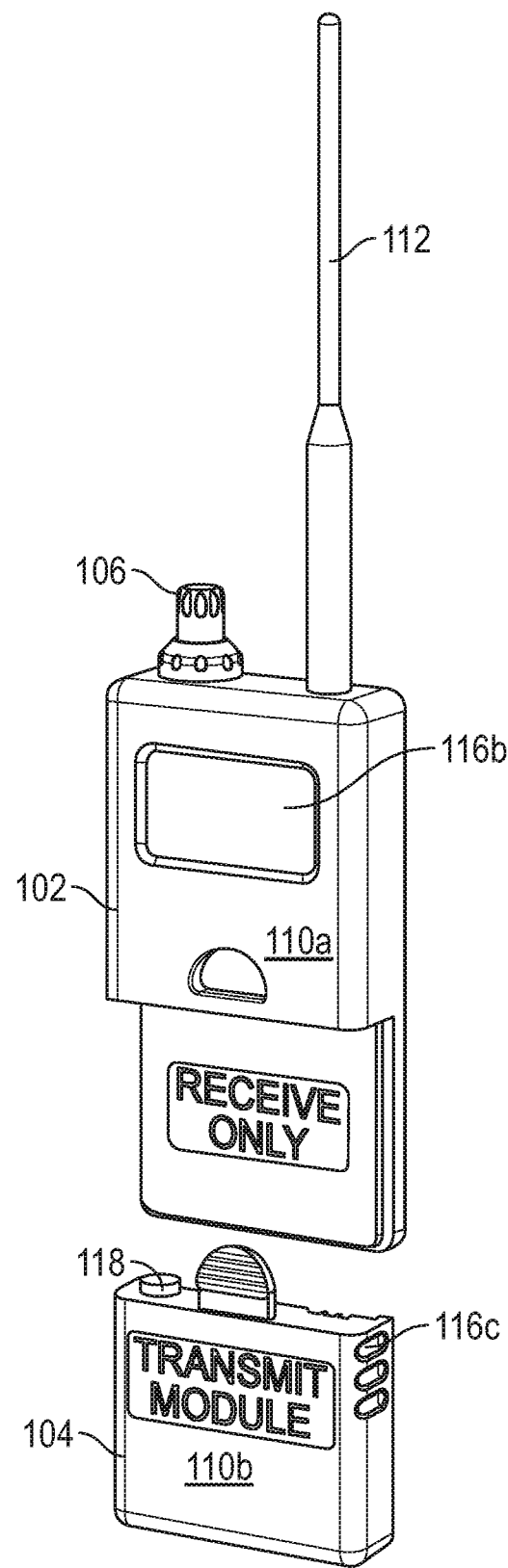
FIG. 2 illustrates a perspective view of the two-way communication device shown in FIG. 1, with a receiver portion detached from a transmitter portion, in accordance with an embodiment of the present invention.

As FIG. 2 illustrates, the transmitter portion 104 physically detaches from the receiver portion 102, such that detaching the transmitter portion 104 enables the device 100 to receive communications but not respond. The receiver portion 102 and the transmitter portion 104 may or may not operate independently when detached. This detachability allows the receiver portion 102 to be carried into secure areas where transmitters are not allowed without losing the ability to be contacted.

In one embodiment, digital responses can be stored in the receiver portion 102, and then automatically sent once the transmitter portion 104 is re-attached. Alternatively, a user can re-attach the transmitter portion 104 and then send a response, or initiate two-way, real-time communications.

To indicate detachment, the receiver portion 102 detects that the transmitter portion 104 is detached via a signal pin 118 on the detachable connector. The receiver knows the transmitter portion is disconnected by virtue of the signal pin on the connector being disconnected. The receiver portion then enters a Receive Only mode. Receive Only mode allows the receiver portion 102 to remind the user that the transmitter portion 104 and the receiver portion 102 are no longer connected. In this manner, the device 100, if needed, remembers the need to respond once the transmitter is reconnected. Turning now to the electronic block diagram in FIG. 3, the device 100 comprises an indicator portion 106 that is operational on the receiver portion 102 to indicate whether the transmitter portion 104 is detached or attached thereto.

In one embodiment, the indicator portion 106 is a light. The light illuminates a green color to indicate the transmitter portion 104 is attached to the receiver portion 102. The light illuminates a red color to indicate the transmitter portion 104 is detached from the receiver portion 102. In other embodiments, however, the indicator portion 106 emits an audible signal to indicate attachment/detachment status between the receiver and transmitter portions 102, 104.

The indicator portion 106 provides a simple method of identifying when the transmitter portion 104 is attached to the receiver portion 102. For example, when the transmitter is removed, a large green indicator is exposed, showing that the unit is cleared for use in a classified area. When the transmitter is attached, the green indicator is replaced by a red indicator, showing that the unit should not be in any classified area.

Figure 3:
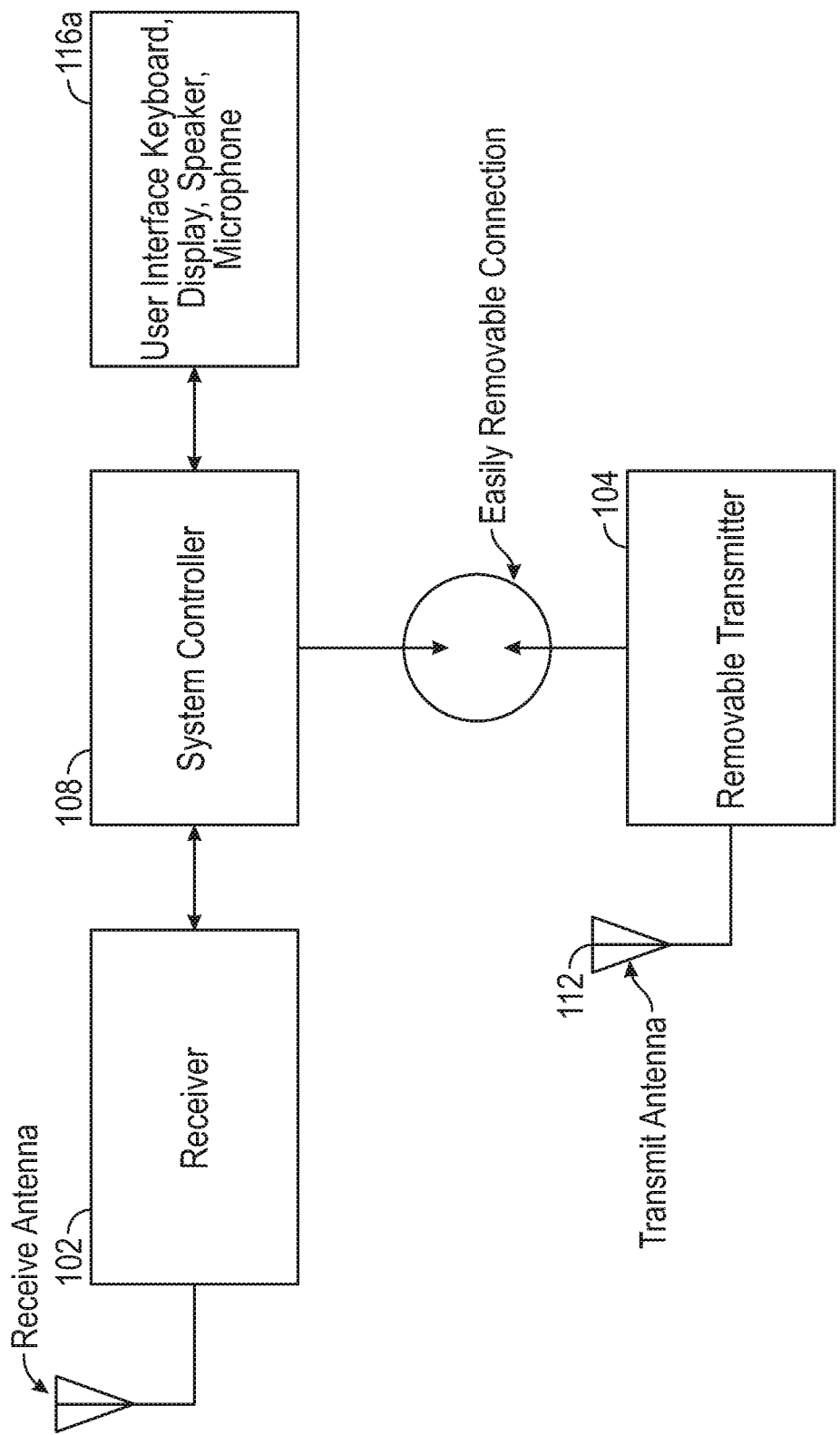
FIG. 3 illustrates a block diagram of a two-way communication device with detachable transmitter, in accordance with an embodiment of the present invention.

Again, looking at FIG. 3, the device 100 further comprises a user interface unit 116a-c that is operationally coupled to the receiver portion 102. The user interface unit 116a-c is configured to input and receive data for communications. In some embodiments, the user interface unit 116a-c may include, without limitation, a keyboard 116a, a microphone 116b, and a speaker 116c. The device 100 further comprises a control unit 108 operationally coupled to the user interface unit 116a-c. The control unit 108 is configured to regulate communication signals to and from the receiver portion 102 and the transmitter portion 104. The device 100 further comprises a power supply 114 for powering the receiver portion 102, or the transmitter portion 104, or both. The power supply 114 may include at least one of a battery, such as a rechargeable battery, a solar cell, a super cap, or other powering devices known in the art.

The device 100 further comprises at least one housing 110a, 110b that encapsulates the receiver portion 102 and the transmitter portion 104. The housing 110a, 110b helps to inhibit moisture, dust, and physical contact to the receiver portion 102 and the transmitter portion 104. The housing 110a-b is also designed for resistant to outside damaging effects, such as static electricity, external metal pieces causing shorts, etc. In one embodiment, the housing 110a, 110b has a rectangular shape. An antenna 112 may extend from the housing 110a to enhance communication signals. The antenna 112 may also be internal to the device 100. The housing 110a-b allows the receiver portion 102 and the transmitter portion 104 to be separated without damage to either, even when power is switched on.

Figure 4:
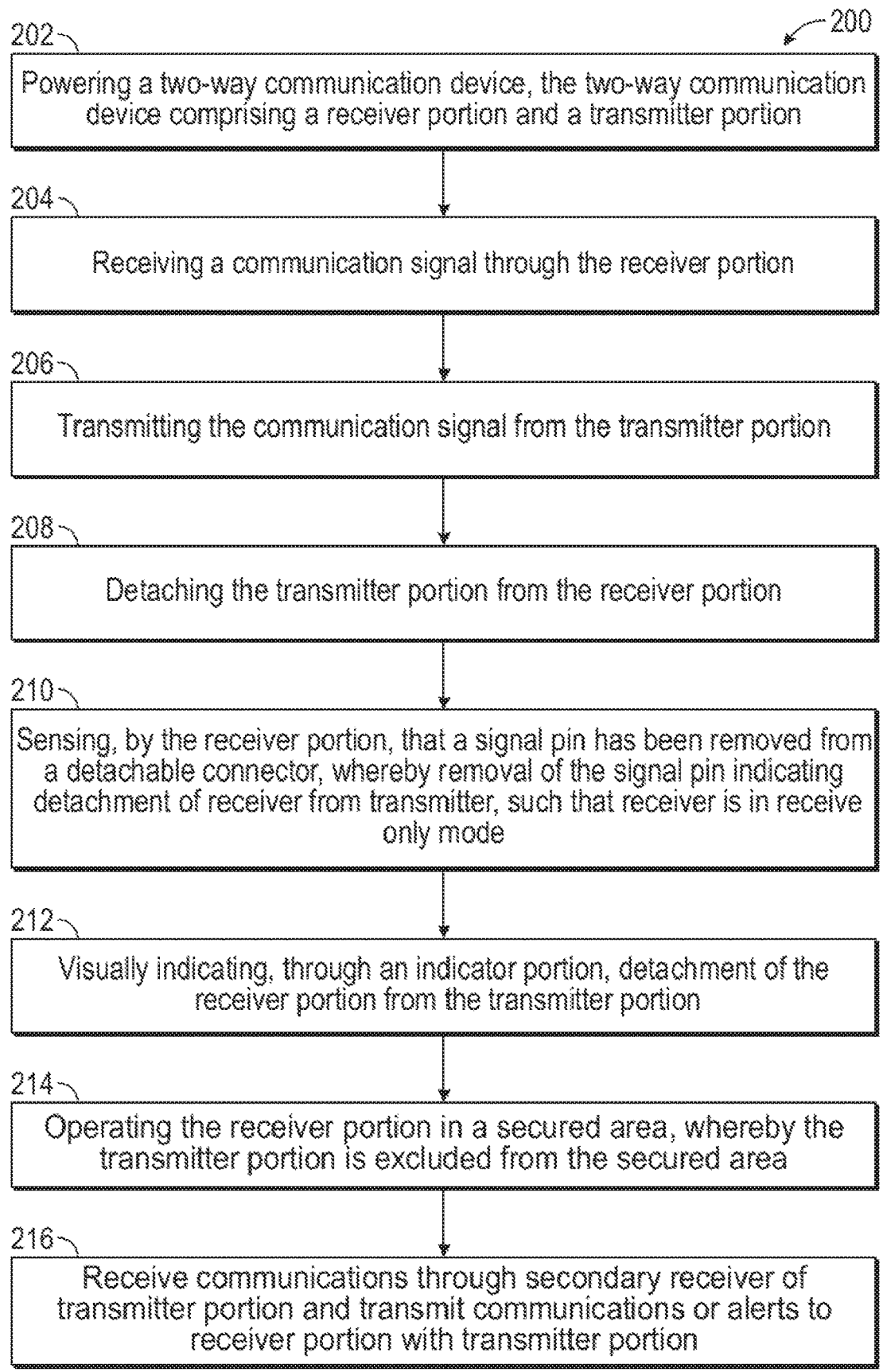
FIG. 4 illustrates a flowchart of an exemplary method for operation of a two-way communication device, in accordance with an embodiment of the present invention.

FIG. 4 illustrates a flowchart of an exemplary method for operation of a two-way communication device. The method includes an initial Step 202 of powering a two-way communication device, the two-way communication device comprising a receiver portion and a transmitter portion. The method 200 may further comprise a Step 204 of receiving a communication signal through the receiver portion. A Step 206 includes transmitting the communication signal from the transmitter portion.

In some embodiments, a Step 208 comprises detaching the transmitter portion from the receiver portion. A Step 210 includes sensing, by the receiver portion, that a signal pin has been removed from a detachable connector, whereby removal of the signal pin indicating detachment of the receiver portion from the transmitter portion, such that receiver is in Receive Only mode. In some embodiments, a Step 212 may include visually indicating, through an indicator portion, detachment of the receiver portion from the transmitter portion. Step 214 comprises operating the receiver portion in a secured area, whereby the transmitter portion is excluded from the secured area.

In some embodiments a further step includes Step 216 of receiving communications through a secondary receiver of a detached transmitter portion 104 and transmitting the communications or alerts to a detached receiver portion 102 with transmitter portion 104. This Step 216 is applicable in particular embodiments in which two-way communication device 100 includes a transmitter portion 104 that includes a secondary receiver (see, e.g., secondary receiver 520B of FIG. 5). Using a secondary receiver (e.g., 520B) allows for an immediate response to an in-coming communication from the transmitter portion 104 to the receiver portion 102, such as in cellular or data communication embodiments. For example, in embodiments in which two-way communication device 100 is a cellular telephone, the secondary receiver of the transmitter portion 104 would allow the transmitter portion 104 to receive a call and then alert the user's detached receiver portion of the call. The user could then leave the secure area and take the call by reconnecting the transmitter portion 104 and receiver portion 102.

Figure 5:
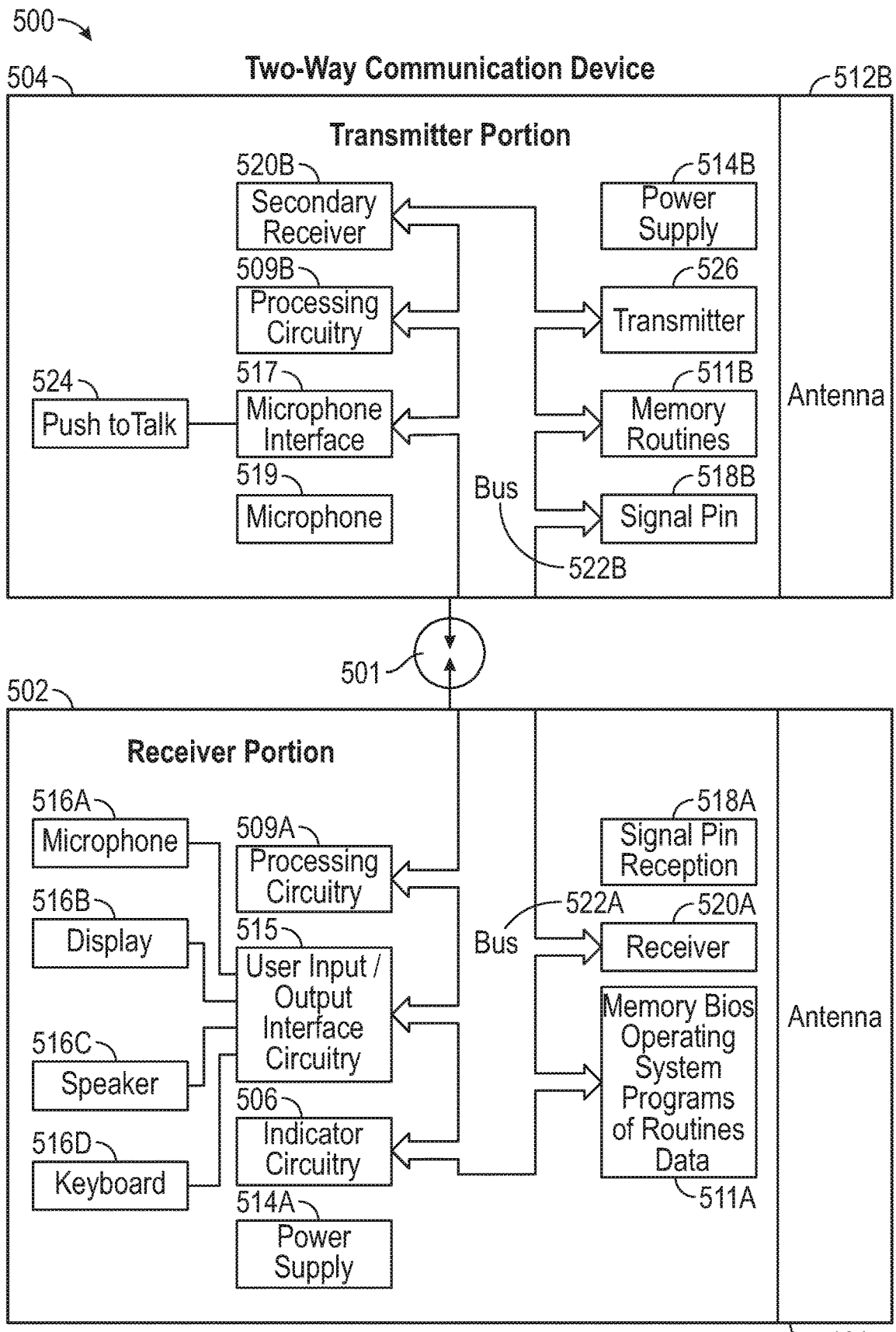
FIG. 5 illustrates a block diagram of a mobile two-way communication device, showing various components of the device.

FIG. 5 is a block diagram of a mobile two-way communication device 500 showing various components of the device. Because FIG. 5 is a block diagram, the various items to be discussed are shown in a simplified block format. Certain details are omitted to avoid clutter and for clarity of presentation. In addition to being a mobile device, two-way communication device 500 is capable of wireless communication.

Two-way communication device 500 includes receiver portion 502 and transmitter portion 504. Receiver portion 502 and transmitter portion 504 are configured to be coupled together via a detachable connection 501. Although in FIG. 5 the transmitter portion 504 is shown in an upper position and the receiver portion 502 is shown below the transmitter portion 504, this is merely one design choice and the reverse would also be acceptable.

Receiver portion 502 includes processing circuitry 509A which is communicably coupled with bus 522A. In some embodiments processing circuitry 509A includes one or more processors configured for executing executable code residing in a memory, such as memory 511A. In other embodiments processing circuitry 509A includes other types of processing circuitry, such as an application-specific integrated circuit (ASIC).

In some embodiments, receiver portion 502 further includes memory 511A which in various embodiments may include, for example, one or more of read-only memory, random access memory, a removable memory, a non-removable memory, volatile memory (e.g. RAM, cache memory, etc.), and/or a non-volatile memory (e.g., hard drive, flash memory, etc.). Memory 511A may include a bios, an operating system, application programs, and data, including program and/or user data. Memory 511A is operably coupled with processing circuitry 509A via bus 522A. In alternative embodiments using, for example, an ASIC, less memory capability would be required since memory to hold programs or routines could be minimized or even avoided.

Receiver portion 502 further includes user input/output interface circuitry 515, which in various embodiments may provide an interface for at least one of a microphone 516A, a display 516B (which in some embodiments is a touchscreen display), a speaker 516C, or a keyboard (which in some embodiments is a virtual keyboard shown on a touchscreen display) 516D. These input/output devices 516A-516D may, in some embodiments, be configured to receive user input that includes at least one of voice communication, text messages, email communications, or other types of electronic communications. User input/output interface circuitry 515 is communicably coupled with at least processing circuitry 509A and memory 511A via bus 522A. In some embodiments, microphone 516A is not a part of receiver portion 502, but instead a microphone is part of transmitter portion 504 (discussed below).

Receiver portion 502 further includes indicator circuitry 506 which includes an indicator (and/or circuitry to control an indicator), such as indicator 106 of FIG. 1. Receiver portion 502 also includes signal pin reception 518A which is configured to receive signal pin 518B (discussed below). In some embodiments, both signal pin reception 518A and signal pin 518B are part of detachable connection 501.

Receiver portion 502 further includes receiver 520A and antenna 512A. Receiver 520A is operable to receive electronic communication signals via antenna 512A, with which it is communicably coupled. In some embodiments, receiver 520A is operable to receive electronic communication signals via antenna 512A when transmitter portion 504 is detached from receiver portion 502. That is, when receiver portion is in receive only mode. Receiver is also operably coupled with at least processing circuitry 509A and memory 111A via bus 522A.

Turning specifically to bus 522A, bus 522A is configured to be communicably coupled with buss 522B of the transmitter portion 504, when transmitter portion 504 is coupled with receiver portion 502.

Receiver portion 502 further includes power supply 514A. Power supply 514A is operably coupled to supply power to the various circuitries of receiver portion 502, including without limitation, processing circuitry 509A, memory 511A, and etc. (illustration of these connections to these various circuitries is omitted for simplicity). Power supply 514A may, in some embodiments, be configured to supply power to the various circuitries of the transmitter portion 504 when transmitter portion 504 is coupled with receiver portion 502. In other embodiments, transmitter portion 504 may have a separate power supply that is operable even when transmitter portion 504 is coupled with receiver portion 502. Power supply 514A is at least one of a battery, such as a rechargeable battery, a solar cell, a super cap, or other powering devices known in the art.

Continuing with reference to FIG. 5, transmitter portion 504 may include processing circuitry 509B and bus 522B. In some embodiments processing circuitry 509B is in a sleep or other de-activated mode when transmitter portion is coupled with receiver portion 502. In these circumstances, processing circuitry 509A of receiver portion 502 may serve transmitter portion 504. In other embodiments, processing circuitry 509B is in an active mode whenever two-way communication device 500 is in an on state. Similar to the above discussion regarding processing circuitry 509A, processing circuitry 509B may include one or more processors configured to execute executable instructions stored on a memory or, in other embodiments, may be a circuit such as, for example, an ASIC or other circuit with hard-wired processing logic.

Bus 522B is configured to be communicably coupled with bus 522A of receiver portion 502 when transmitter portion 504 is coupled with receiver portion 502. When transmitter portion 504 is not coupled with receiver portion 502 then bus 522B is configured to operate independently of bus 522A.

In some embodiments, transmitter portion 504 also includes memory 511B which in various embodiments may include one or more of, for example and without limitation, read-only memory, random access memory (RAM), a removable memory, a non-removable memory, a volatile memory (e.g. RAM, cache memory etc.), and/or a non-volatile memory (e.g., hard drive, flash memory etc.). Memory 511B may include programs or routines and may be more limited in capability that memory 511A of receiver portion 502. In other embodiments memory 511B does not include memory for user data. Memory 511B is operably coupled with processing circuitry 509B via bus 522B. When processing circuitry 509B includes an ASIC or other hard-wired logic, memory 511B may be omitted from transmitter portion 504, or reduced since programming is hard-wired into processing circuitry 509B.

Transmitter portion 504 includes transmitter 526, which includes a transmitter and is communicably coupled with bus 522B and with antenna 512B. In some embodiments, when transmitter portion 504 is coupled with receiver portion 502, transmitter 526 may be controlled by processing circuitry 509A of receiver portion 502 via busses 522A and 522B (processing circuitry 509B being in sleep mode or other inactive state) and in some embodiments based on programs or routines stored in memory 511A. In other embodiments even when transmitter portion 504 is coupled with receiver portion 502, transmitter 526 is controlled by processing circuitry 509B, in some embodiments based on programs or routines stored in memory 511B. In some embodiments transmitter 526 is configured to be operable even when transmitter portion 504 is uncoupled from receiver portion 502.

In some embodiments, transmitter portion 504 includes microphone interface 517 which is communicably coupled with bus 522B and with microphone 519 and with push-to-talk button 524. In other embodiments, transmitter portion 504 does not include microphone 519 and instead microphone 516A is included in receiver portion 502 and is communicably coupled with user input interface 515.

In some embodiments, transmitter portion 504 further includes signal pin 518B. Signal pin 518B is configured to connect with signal pin reception 518A of receiver portion 502. Of course, the location of signal pins 518B and signal pin reception 518A could be swapped so that signal pin 518B are on receiver portion 502 and signal pin reception 518A are on transmitter portion 504. Further, as discussed above, in some embodiments both signal pin reception 518A and signal pin 518B are part of detachable connection 501.

As discussed above, transmitter portion 504 may also include antenna 512B, which could be an external antenna, a hidden antenna, or a combination of both. When transmitter portion 504 is coupled with receiver portion 502, antenna 512B may couple with antenna 512A of receiver portion 502. When transmitter portion 504 is detached from receiver portion 502, antenna 512B enables transmitter 526 to be used to continue to transmit.

Transmitter portion 504 also includes a power supply 514B that is separate and apart from a power supply 514A of the receiver portion 502. In some embodiments, power supply 514B is only for performing limited operations when the transmitter portion 504 is detached from the receiver portion 504. Power supply 514B is at least one of a battery, such as a rechargeable battery, a solar cell, a super cap, or other powering devices known in the art.

In some particular embodiments transmitter portion 504 includes secondary receiver 520B which is operable when transmitter portion 504 is detached from receiver portion 502. In those embodiments with a secondary receiver 520B it is communicably coupled with bus 522B and with antenna 512B and controlled by processing circuitry 509B, in some embodiments based on programs or routines stored in memory 511B or based on hard-wired logic of processing circuitry 509B. In these embodiments two-way communication device includes two receivers—receiver 520A in receiving portion and secondary receiver 520B in transmitting portion.

Figure 6:
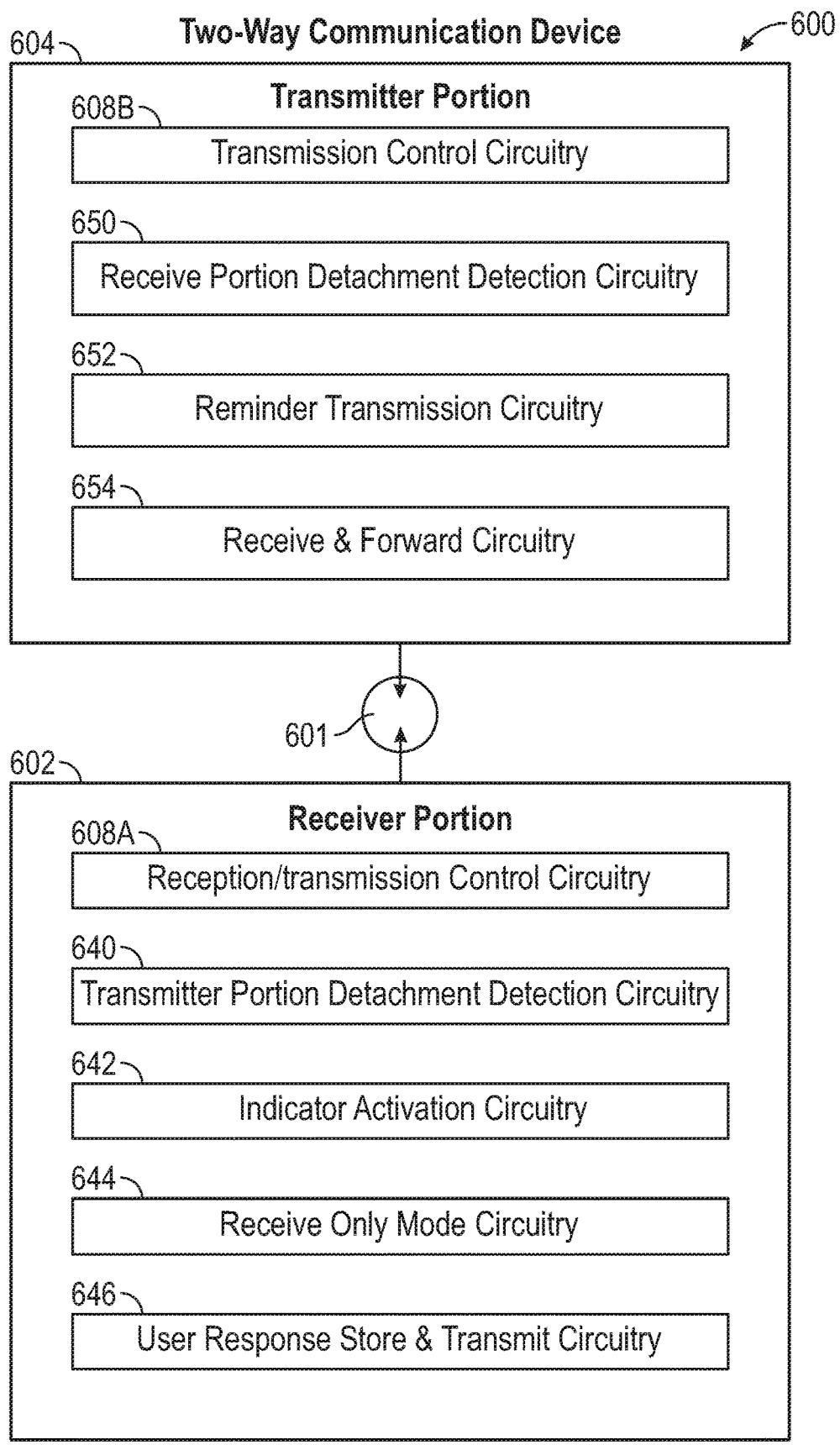
FIG. 6 illustrates a block diagram of a mobile two-way communication device, showing various circuitries of the device.

FIG. 6 is a block diagram of an example two-way communication device 600 showing various circuitries for performing various operations. Unless otherwise indicated, the various circuitries discussed below may be configured to perform their functions automatically, without the need for user intervention. Although depicted as separate circuitries, in different embodiments these circuitries may or may not overlap and may or may not be the same circuitries. In some embodiments, device 600 could be device 500 of FIG. 5. Although two-way communication device 600 may be a different device from two-way communication device 500 of FIG. 5, for simplicity the following discussion assumes they are the same device with device 600 having the components discussed above relative to FIG. 5.

FIG. 6 depicts a two-way communication device 600 with a transmitter portion 604 that is configured to be attachable to and detachable from a receiver portion 602, wherein the two-way communication device 600 is configured to receive communications with the receiver portion 602 when the transmitter portion 604 is detached. And wherein the receiver portion 602 does not include a transmitter and wherein, when the transmitter portion 604 is detached from the receiver portion 602, the receiver portion 602 is unable to access the transmitter 526 of the transmitter portion 504. Transmitter portion 604 and receiver portion 602 are detachably coupled via detachable connection 601. Although transmitter portion 604 and receiver portion 602 could be different components than transmitter portion 504 and receiver portion 502 of FIG. 5, for ease of discussion only, it is assumed that they are the same and will be referred to interchangeably.

In some embodiments receiver portion 602 includes reception/transmission control circuitry 608A, transmitter portion detachment detection circuitry 640, indicator activation circuitry 642, receive only mode circuitry 644, and user response store and transmit circuitry 646.

In some embodiments, reception/transmission control circuitry 608A is configured to regulate communication signals to and from the receiver 520A and, at least when the receiver portion 502 is attached to the transmitter portion 504, to and from the transmitter 526. Reception/transmission control circuitry 608A may be similar to or even the same as system controller 108 of FIG. 3. In some embodiments reception/transmission circuitry 608A includes at least processing circuitry 509A and memory 511A of receiver portion 502.

Transmitter portion detachment detection circuitry 640 is configured to determine that the transmitter portion 504 is detached from the receiver portion 502. In some embodiments, Transmitter portion detachment detection circuitry 640 is configured to determine that the transmitter portion 504 is detached from the receiver portion 502 at least in part via signal pin 518B. In some embodiments, transmitter portion detachment detection circuitry 640 may include processing circuitry 509A configured to execute a routine stored in memory 511A. Said routine may include detecting the presence or absence of a weak electrical signal through signal pin 518A and signal pin reception 518B, and thereby determining that signal pin reception 518A is detached from signal pin 518B if the weak electrical signal is absent. One of ordinary skill in the art will be familiar with techniques for determining if signal pin 518B and signal pin reception 518B are connected.

Indicator activation circuitry 642 is configured to cause an indicator (e.g. indicator 106 of FIGS. 1 and 2) to activate thereby indicating to a user that transmitter portion 504 is detached from receiver portion 502, wherein the indicator activation circuitry 642 is further configured to be responsive, at least in part, to the transmitter portion detachment detection circuitry 640. For example, based on a determination by transmitter portion detachment detection circuitry 640 that transmitter portion 504 is detached from receiver portion 502 (e.g. based on a determination that signal pin reception 518A is detached from signal pin 518B), indicator activation circuitry 642 may cause indicator 106 to activate. In some embodiments, indicator activation circuitry 642 includes processing circuitry 509A configured to execute a routine stored in memory 511A. The routine may include receiving a determination that that transmitter portion 504 is detached from receiver portion 502 and based on this determination causing indicator 106 to activate.

In some embodiments, receive only mode circuitry 644 is configured to cause the receiver portion 502 to enter a receive only mode in which the receiver portion 502 is configured to continue to receive communications with the transmitter portion 504 detached from the receiver portion 502, wherein the receive only mode circuitry 644 is further configured to be responsive, at least in part, to the transmitter portion detachment detection circuitry 640. For example, in some embodiments, based on a determination by transmitter portion detachment detection circuitry 640 that transmitter portion 504 is detached from receiver portion 502 (e.g. based on a determination that signal pin reception 518A is detached from signal pin 518B), receive only mode circuitry 644 may cause receiver portion 502 to enter a receive only mode. In some embodiments processing circuitry 509A may execute a routine stored in memory 511A. The routine may include receiving a determination that that transmitter portion 504 is detached from receiver portion 502 and based on this determination causing receiver portion 502 to enter a receive only mode (e.g., at least partly by causing processing circuitry 509A to indicate a change in state (e.g., changing the value of a bit) to thereafter prevent processing circuitry 509A from attempting to send communications for transmission to transmitter 526).

User response store and transmit circuitry 646 is configured, upon receiving a user response to a communication while receiver portion 502 is in receive only mode, to cause the user response to be stored until the receive only mode ends, and being further configured, when receive only mode has ended, to cause the user response to be transmitted (e.g. by transmitter 526). For example, upon receiving a user response to a communication, user response store and transmit circuitry 646 may be configured to determine that receiver portion 502 is in receive only mode and based on that determination to cause the user response to be stored in memory 511A. User response store and transmit circuitry 646 may be further configured to determine when receiver portion 502 is no longer in receive only mode. User response store and transmit circuitry 646 may also be further configured, based on a determination that receiver portion 502 is no longer in receive only mode, to identify one or more stored user responses in memory 511A and to then cause these stored user responses to be transmitted (e.g., via transmitter 526).

For example, user response store and transmit circuitry 646 may include processing circuitry 509A receiving a user response via user interface input 515, determining that the state of receiver portion 502 is receive only mode and sending the user response to memory 511A for storage as data. Processing circuitry 509A may be configured to periodically check the state of receiver portion 502 to determine if the receive only mode has ended. Based on a determination that the receive only mode has ended, processing circuitry 509A may be configured to retrieve stored user responses from memory 511A and send to transmitter 526 for transmission.

Continuing to reference FIG. 6, in some embodiments, transmitter portion 604 includes transmission control circuitry 608B, receiver portion detachment detection circuitry 650 and reminder transmission circuitry 652. In particular embodiments, transmitter portion further includes receive & forward circuitry 654.

Transmission control circuitry 608B is configured to regulate communication signals to and from transmitter 526, at least when transmitter portion 504 is detached from receiver portion 502, whereby transmission control circuitry 608B configures transmitter portion for at least some transmitting (e.g., reminder communications discussed below) when transmitter portion 504 is detached from receiver portion 502. In some embodiments transmission control circuitry 608B includes at least processing circuitry 509B and memory 511B. In alternative embodiments, transmitter portion 504 does not include transmission control circuitry 608B and is not configured to transmit when transmitter portion 504 is detached from receiver portion 502

Receiver portion detachment detection circuitry 650 is configured to determine that transmitter portion 504 is detached from receiver portion 502. For example, receiver portion detachment detection circuitry 650 may include processing circuitry 509B configured to execute a routine stored in memory 511B. Said routine may include detecting the presence or absence of a signal between signal pins 518B and signal pin reception 518A and thereby determining, if the signal is absent, that signal pin reception 518A is detached from signal pin 518B. Alternatively, receiver portion detachment detection circuitry 650 may include processing circuitry 509B, which is an ASIC with the routine hard-wired into circuitry 509B.

Reminder transmission circuitry 652 is configured to cause a reminder communication to be transmitted to receiver portion 502 to indicate to a user that transmitter portion 504 is still detached from receiver portion 502. For example, based on a determination by receiver portion detachment detection circuitry 650 that transmitter portion 504 is detached from receiver portion 502 (e.g. based on a determination that signal pin reception 518A is detached from signal pin 518B), Receiver portion detachment detection circuitry 650 may cause transmitter 526 to transmit a reminder communication. In some embodiments, reminder transmission circuitry 652 includes processing circuitry 509B configured to execute a routine stored in memory 511B. The routine may include receiving a determination that that transmitter portion 504 is detached from receiver portion 502 and based on this determination causing sending a reminder communication to transmitter 526 for transmission to receiver portion 502. Alternatively, reminder transmission circuitry 652 may include processing circuitry 509B, which is an ASIC with the routine hard-wired into circuitry 509B.

In some embodiments reminder transmission circuitry 652 may be configured to send as the reminder signal, a signal that may be used to authenticate that a detached receiver portion 502 belongs with a given detached transmitter portion 504. For example, transmitter portion 504 may be configured with a user input interface feature, such as a button (now shown), that may be configured for causing the transmitter portion 504 to immediately send a reminder signal to receiver portion 502. When the receiver portion 502 receives the reminder signal and responds (e.g., by lighting up indicator 106, by emitting a sound, or by other visual and/or auditory signal), then the receiver portion 502 is authenticated as belonging with the transmitter portion 104.

In some particular embodiments transmitter portion further includes receive and forward circuitry 654. Receive and forward circuitry 654 may be configured for receiving communications through a secondary receiver 520B of a detached transmitter portion 504 and transmitting the communication to a detached receiver portion 502 at least in part with transmitter 526 of transmitter portion 504. Receive and forward circuitry is only present in particular embodiments in which two-way communication device 500/600 includes a transmitter portion 504 that includes a secondary receiver 520B. Receive and forward circuitry 654 (using secondary receiver 520B) allows for an immediate response to an in-coming communication from the transmitter portion 504 to the receiver portion 502, such as in cellular or data communication embodiments. For example, in embodiments in which two-way communication device 500/600 is a cellular telephone, the receive and forward circuitry (using secondary receiver 520B) would allow the transmitter portion 504 to receive a call and then alert the user's detached receiver portion 502 of the call. The user could then leave the secure area and take the call by reconnecting the transmitter portion 504 and receiver portion 502.

In some embodiments receive and forward circuitry 654 could be implemented with secondary transmitter 520 which is configured to receive communications when transmitter portion 504 is detached from receiver portion 502, with processing circuitry 509B which may be configured (based on one or more routines stored in memory 511B or in hardwired logic of processing circuitry 509B) to cause transmitter 526 to transmit the received communications or alerts of the communications to receiver portion 502, with transmitter portion 526, and with antenna 512B.

The above two-way communication device 600 has a number of advantages. For example, in contemplated use when transmitter portion 504 is detached from receiver portion 502, the portion that remains with the user to enter the secure non-transmission zone is the receiver portion 502. Without an attached transmitter portion 504, the receiver portion 502 is physically prevented from transmitting. This is not merely a software-implemented airplane mode, this is at least partly a physical prevention of transmission by the remaining receiver portion 502. This is because the receiver portion 502 does not include a transmitter or other transmission circuitry and is also unable to access the transmitter 526 of transmission portion 504. Security personnel in a secure non-transmission zone can quickly determine that the transmission portion 504 has been detached from the receiving portion 502 and based thereupon admit the user to the secure non-communication zone carrying only the receiver portion 502.

The above physical disabling of the transmission capability of the two-way communication device 600 is not dependent on the use of a third-party device to force the two-way communication device into some type of airplane mode. There is no need to be concerned about compatibility between the two-way communication device 600 and such a third-party device. And there is no need to worry about whether a software modification has made the two-way communication device 600 impervious to the third-party device.

In some embodiments, the above physical disabling of the transmission capability of the two-way communication device, still allows the user to use the receiver portion 502 to be used to continue receiving communications. This is because, in these embodiments, the transmission portion 504 which is detached includes not a transceiver (which includes both the device's receiving and transmitting capabilities), but a transmitter which when removed removes only the devices transmitting capabilities.

In the above scenario, the user who is admitted to the secure non-communication zone can still use the receiver portion 502 to receive and review incoming communications. In some embodiments these incoming communications could be voice communications, text messages, emails, or other types of electronic communications.

Figure 7:
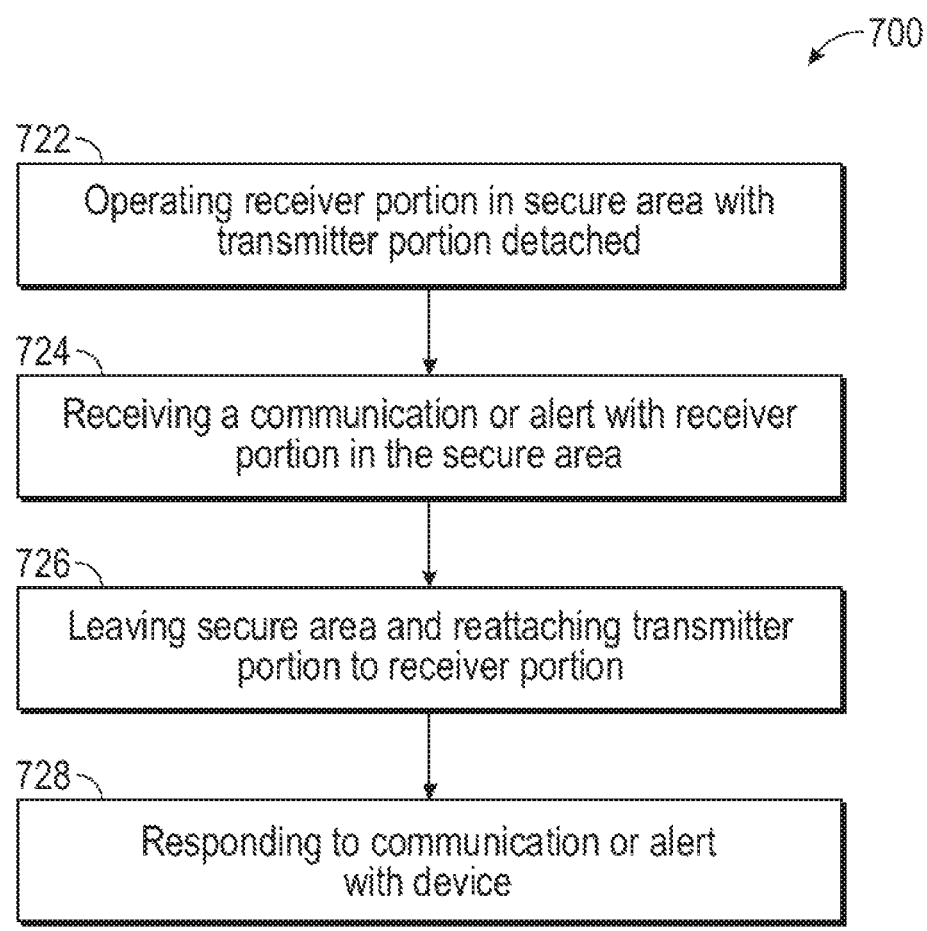
FIG. 7 illustrates a flowchart of an exemplary method of operating a two-way communication device to receive and respond to a communication or alert.

FIG. 7 illustrates a flowchart of an exemplary method 700 of operating a two-way communication device to receive and respond to a communication or alert. The method includes an initial Step 722 of operating a receiver portion (e.g. 102 or 502) in a secure area with the transmitter portion (e.g. 104 or 504) detached. For example, before entering a non-transmission zone where both transmission and transmitters are prohibited, a user may detach the transmitter portion from the receiver portion and leave the transmitter portion behind (e.g., at a security station) before entering the non-transmission zone.

The method 700 may further comprise Step 724 of receiving a communication (e.g., a voice call, an email, a text message, or other communication) or an alert (e.g. a notice of a communication, a telephone number, an email address, or other description of a communication) with the receiver portion in the secure area. For example, after entering a non-transmission zone with the detached receiver portion (the detached transmitter portion having been left outside the non-transmission zone) receiving a communication or an alert with the detached receiver portion. In some embodiments a communication is received originating from another two-way communication device operated by another user. In some embodiments, an alert is received from a paging service and the alert is a page. In these embodiments it is not necessary for transmitter portion to include a secondary receiver 520B or receive & forward circuitry 654.

In yet other embodiments in which the transmitter portion is configured to receive and forward messages (e.g., in embodiments where transmitter portion has a secondary receiver 520B and/or receive & forward circuitry 654), the communication or alert may be received from transmitter portion. However, as discussed elsewhere, in some embodiments, transmitter portion does not include a receiver, such as secondary receiver. In these embodiments the communication or alert could not be received from transmitter portion.

The method 700 may further comprise Step 726 of leaving the secure area and reattaching the transmitter portion to the receiver portion. For example, a user may leave a non-transmission zone and return to a location where the transmitter portion was left behind (e.g., a security station). The transmitter portion may then be retrieved and reattached.

Continuing with reference to FIG. 7, the method 700 may further comprise Step 728 of responding to the communication or alert with the two-way communication device (the transmitter portion having been reattached). For example, the user having arrived in a non-secure area (e.g., where transmission and transmitters are permitted) and having reassembled the transmitter portion and the receiver portion may then use the assembled two-way communication device to respond to the communication or alert. This concludes discussion of this method 700.

In one aspect, some embodiments may include delivering a two-way communication device (e.g., device 100, 500, or 600) to a certifying authority, such as the National Security Agency ("NSA") for certification the two-way communication device is permitted to be used in secure (non-transmission) environments. In some embodiments, this could be done with an exemplary device rather than for all two-way communication device.

In a further aspect, each of the two-way communication devices (e.g., devices 100, 500, or 600) including at least some or all of their components and circuitries are capable of being implemented in an analog and/or digital architecture.

In a further aspect, as discussed above, the two-way communication devices (e.g. devices, 100, 500, or 600) may be, in various embodiments, all manner of wireless devices known to those skilled in the art including, without limitation, transceivers, cellular telephones, pagers, two-way radios, walkie-talkies, wireless modems (Wi-Fi), personal computing devices, tablet computers, laptop computers, smartwatches, and the like.

In a further aspect, the two-way communication devices (e.g. devices 100, 500, 600) may, in various embodiments, be encrypted or unencrypted. If encrypted, any type of encryption may be used including, without limitation, symmetric encryption, asymmetric encryption, public key encryption, and the like. In some embodiments, encryption keys may be shared between the receiver portion and the transmitter portion. In some embodiments using public/private key encryption, each of the receiver portion and the transmitter portion may have their own private key for decryption and/or authentication. Each of the receiver portion and the transmitter portion may then also have the other portion's public key for encryption. Or, the transmitter portion and the receiver portion may share the same public/private key pair(s).

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A two-way communication device with detachable transmitter, the device comprising:
    a receiver portion for receiving communication signals;
    a transmitter portion for transmitting communication signals, the transmitter portion being detachably attached to the receiver portion,
    whereby the receiver portion cannot transmit communication signals and the transmitter portion cannot receive communication signals,
    whereby the receiver portion and the transmitter portion may or may not operate independently when detached;
    a user interface unit operationally coupled to the receiver portion, the user interface unit for inputting and receiving data for communications,
    whereby the data can be stored in the receiver portion when the receiver portion is detached from the transmitter portion and automatically transmitted when the receiver portion is reattached to the transmitter portion;
    an indicator portion operationally coupled to the receiver portion, the indicator portion for indicating whether the transmitter portion is detached or attached to the receiver portion and for indicating via the user interface unit whether the device is capable of transmitting communication signals;
    a control unit operationally coupled to the user interface unit, the control unit regulating communication signals to and from the receiver portion and the transmitter portion;
    at least one housing encapsulating the receiver portion and the transmitter portion, the housing helping to inhibit moisture, dust, and physical contact to the receiver portion and the transmitter portion; and
    a power supply for powering the receiver portion, or the transmitter portion, or both.

2. The device of claim 1, wherein the receiver portion comprises a speaker, electrical switches and electronic memory.

3. The device of claim 1, wherein the transmitter portion comprises a microphone and electrical switches.

4. The device of claim 1, wherein the user interface unit includes at least one of the following: a keyboard, a microphone, a speaker, a rotary encoder, a trackpad, and a mouse.

5. The device of claim 1, wherein the indicator portion comprises a light.

6. The device of claim 5, wherein the light illuminates a color to indicate the transmitter portion is attached to the receiver portion.

7. The device of claim 6, wherein the light illuminates at least one of a red color or a green color to indicate the transmitter portion is detached from the receiver portion.

8. The device of claim 1, further comprising an LCD, or other display to indicate the transmitter portion is detached from the receiver portion.

9. The device of claim 1, wherein the at least one housing may or may not have a rectangular shape.

10. The device of claim 1, wherein the power supply is at least one of a battery, a solar cell, a super cap, or other powering devices known in the art.

11. The device of claim 1, wherein the two-way communication device is a radio.

12. The device of claim 1, whereby the transmitter portion periodically transmits a signal to the receiver portion indicating detachment there between.

* * * * *